March 8, 1960 G. STUBBS 2,927,463
METHOD OF PREPARING BASAL TEMPERATURE GRAPHS
Filed July 22, 1955
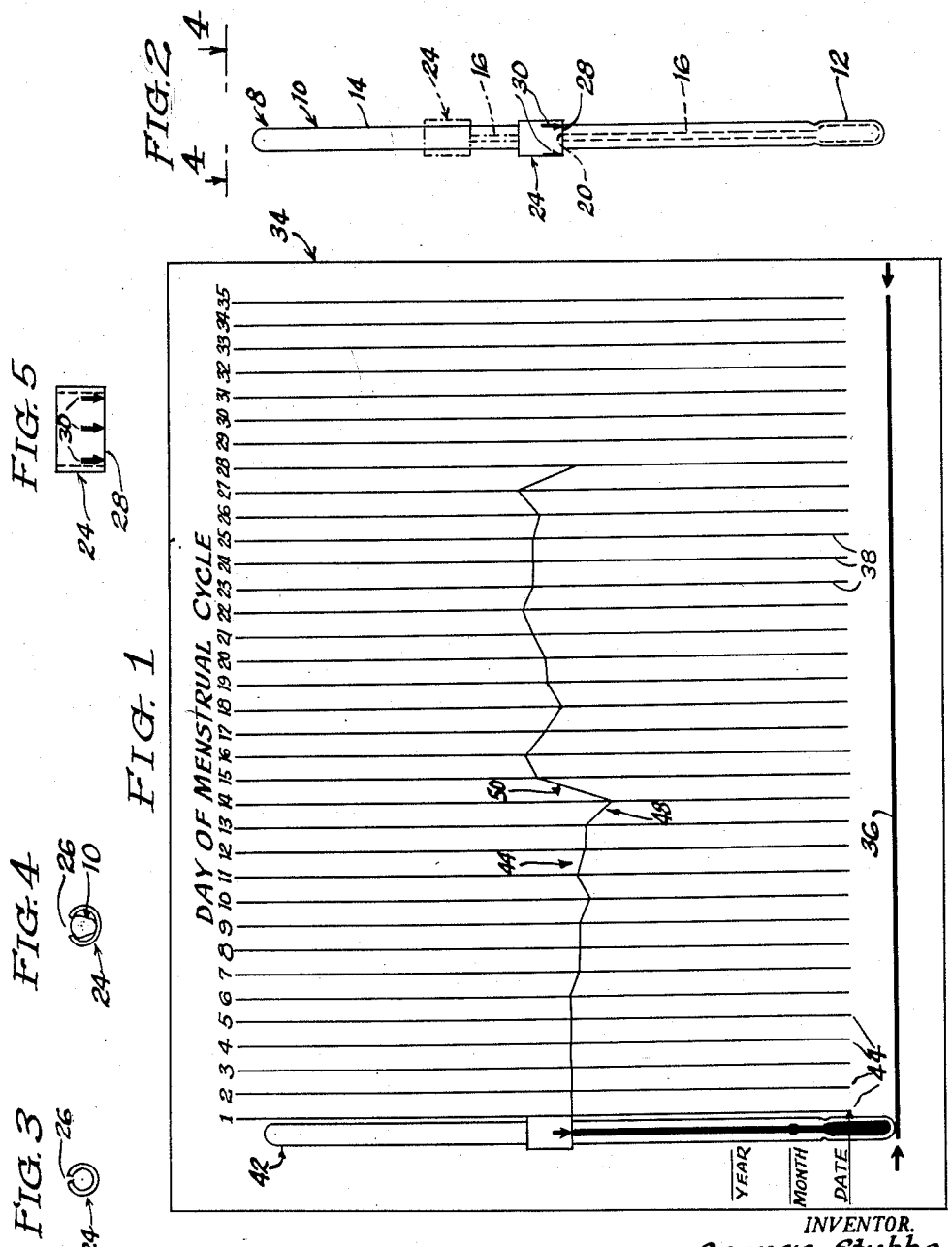
INVENTOR.
George Stubbs
BY
Louis Sheldon
Attorney

2,927,463
METHOD OF PREPARING BASAL TEMPERATURE GRAPHS

George Stubbs, Los Angeles, Calif.

Application July 22, 1955, Serial No. 523,657

1 Claim. (Cl. 73—343.5)

This invention relates to the preparation of basal temperature graphs to be used in determining the time of ovulation, and is concerned more particularly with an improved thermometer and mercury level indicator for facilitating the preparation of such graphs.

It is now thought, that unless there is present an ovum which has been released by the ovary, conception cannot occur. As far as is known, ovulation takes place only once during the menstrual cycle. The exact time of ovulation varies with individuals, but for most women it takes place approximately in the middle of the menstrual cycle.

There is a slight rhythm in the variation in the normal temperature of a healthy woman. Her temperature is lower during the first part of the menstrual cycle than it is during the latter half. The transition from a lower temperature to a higher one occurs at about the time of ovulation.

In order to enable the individual to anticipate with a high degree of accuracy when ovulation will occur, a conventional fever thermometer and a chart having a series of ordinates representing successive days in the cycle and a series of lines parallel to the abscissa and intersecting the ordinates and representing degrees and fractions of degrees Fahrenheit have heretofore been employed. The woman is instructed to read her temperature from the thermometer from day to day and mark the ordinates at the proper places, and draw a graph through the several points throughout the cycle. A properly prepared graph for a normal woman will be characterized by an unusually sharp temperature drop on about the fifteenth day of the menstrual cycle, followed on the next day by an even more decided rise. It is at present generally accepted by fertility experts that ovulation takes place within or close to the interval between the day before the sharp drop and the time of the top of the rise.

The conventional fever thermometer has a temperature range running from about 94° to about 110° over a length of about 3½", and is graduated at intervals of two tenths of a degree, so that the graduations are slightly over $\frac{1}{32}$" apart. At best it is rather difficult, especially for a layman, to read such a thermometer, and particularly is this so where one-tenth and smaller fractions of a degree are involved. The temperature of a normal healthy woman during the menstrual cycle does not vary over all more than about one degree, the temperature drop or drops preceding the sharp drop do not exceed about two tenths of a degree, the aforesaid sharp drop in temperature is usually not more than about one-third of a degree, and the ensuing sharper temperature rise generally does not exceed about one degree. Moreover, it is easy to be careless about the need for great accuracy in reading, and also to forget the reading by the time the proper place on the chart is found to be marked, often requiring a re-reading of the thermometer.

I have therefore developed a special thermometer and a mercury level indicator to be used therewith. This indicator may be readily operated by the woman and does not require her reading the actual temperature, since the woman is concerned only with locating the top of the mercury column. Moreover, it eliminates the necessity for the confusing horizontal lines on the chart, and altogether makes the operation a simple one indeed.

Further objects and advantages of the invention will appear as the description proceeds.

The invention will be better understood upon reference to the following description and the accompanying drawing, in which:

Fig. 1 shows a chart sheet showing among other things, in addition to a chart useful in conjunction with a device embodying features of the invention, a picture of the device showing how the device is to be positioned when a graph mark is to be made.

Fig. 2 is a somewhat different elevational view of the device.

Fig. 3 is a top plan view of the collar before it is expanded onto the thermometer.

Fig. 4 is a top plan view taken on the line 4—4 in Fig. 2.

Fig. 5 is a development of the collar.

Referring now more particularly to the drawing, disclosing illustrative embodiments of the invention, there is shown at 8 a unit comprising an oral clinical type thermometer 10 having a bulb or reservoir 12 and a shank or stem 14 devoid of graduations, said thermometer for the purposes noted above preferably having a temperature range from 97° F. to 100° F. over a length of about four and one-half inches of mercury column 16, so that each tenth of a degree corresponds to a distance of about $\frac{5}{32}$" along the mercury column.

For the purpose of indicating the top 20 of the mercury column 16, I have provided a mercury level indicator in the form of a resilient collar 24 split as at 26 and resilient and having a normal or unstressed inside diameter somewhat smaller than the maximum transverse dimension of the stem 14. Both ends or either end of the thermometer 10 is rounded so as to readily enter an end of and thereby expand the collar 24 and facilitate the telescoping of the collar about the thermometer. The friction between the collar 24, thus expanded, and the thermometer 10 is such as to hold the collar stationary at any position to which it is adjusted, yet insufficient to preclude manual sliding of the collar with but light effort to any desired position. The collar 24 may be formed inexpensively, as by slicing a tube of polyvinylchloride, soft rubber or other suitable material having an inside diameter somewhat smaller than the outside diameter of the stem 14, preferably at right angles to the tube axis, and then cutting the resulting ring longitudinally.

One end 28 of the collar 24 is designated as by arrows 30. One arrow alone might suffice, but since such arrow might chance to be at the back of the collar and therefore invisible to the patient when she is taking a "reading" and she might be confused into marking the chart erroneously, I have provided a plurality of arrows so spaced circumferentially about the collar that at least one or another arrow will be visible to the patient while she is ascertaining the location of the top of the mercury column and when she is about to mark the chart.

A form of chart suitable for use with the thermometer 10 and collar 24 is shown at 34 and comprises a sheet bearing an abscissa or base line 36 and ordinates 38 indicated successively by numerals 1 to say 35, the first such numeral and the ordinate designated by it corresponding ot the first day of the menstrual cycle of the patient. The chart 34 also preferably includes as at 42 a pictorial, schematic or other representation of the assembled thermometer 10 and collar 24 showing how the device is positioned for applying a graph mark to the first ordinate. The patient is instructed to write near the bottom of the first ordinate, representing the first day of her menstrual cycle (and hence the first day on which a graph mark is to be placed on the chart), the calendar date of the start of the cycle, and near the bottoms of the successive ordinates the successive dates, as indicated at 44.

Using the thermometer 10 (with the collar 24 preferably thereon, substantially spaced from the bulb 12) the woman takes her temperature orally for five minutes, immediately after waking, before getting out of bed and before talking, drinking, smoking, or eating, and at the same time every morning. Upon removing the thermometer 10, she slides the collar 24 until the end 28 thereof, to which the arrows 30 point, is even or flush with the top of the mercury column, places the thermometer as noted above at the left of the corresponding date ordinate, and makes a graph mark on that ordinate at the end 28 of the collar. This procedure is repeated daily throughout the menstrual cycle, and the successive marks will define a graph similar to that shown at 44.

Graphs should be made following the above-noted procedure for at least two consecutive months (if conception has not taken place in the meantime) before the probable time of ovulation may be determined.

The graph will show fairly even temperature during menstrual flow, followed by several days of very slightly varying temperatures up or down, but about fifteen days before the start of the next period or flow, there occurs in most women an unusually sharp temperature drop, as indicated at 48, followed on the next day by an even more pronounced temperature rise, as indicated at 50. The drop indicated at 48 is the important one, since a woman will be fertile at such time.

As will be clear from the foregoing, it is unnecessary that any actual temperature be known, since only relative temperatures are important.

Whether the woman assemblies the collar with the thermometer with the arrows 30 pointing away from or toward the bulb 12 is immaterial, since she will know that they point to that collar end 28 which she is to adjust even with the top of the mercury column and she will know that the graph mark is to be made at that ordinate point which is adjacent said collar end when the thermometer is properly placed on the chart.

It is to be noted that the very small temperature variations are not easily discernable on the conventional thermometer nor can the average person using the conventional thermometer be depended upon to mark the chart with sufficient precision for the purpose of the invention.

To facilitate the sliding of the collar along the thermometer, the collar is preferably coated inside with glycerine or other suitable lubricant.

Graphs made as noted have been found by the medical profession to be accurate within a day or two.

The ungraduated thermometer is additionally preferred for the reason that many women who know their temperatures tend to become neurotic and hypochondriac.

Various modifications may suggest themselves to those skilled in the art without departing from the spirit of my invention. Hence I do not wish to be restricted to the specific forms disclosed or uses mentioned, except to the extent indicated in the appended claim, which are to be interpreted as broadly as the state of the art will permit.

I claim:

A method of drawing a human temperature graph with a chart having a base line and spaced time-designating lines extending transversely of said base line and respectively representing successive days of the month, and a thermometer tube of the type having a variable length mercury column therein and adapted for insertion into the user's mouth for the taking of oral temperatures, said method comprising slipping a resilient indicating sleeve having an index point thereon around said tube, which tube makes free sliding engagement with the tube so that it can be slid easily along the tube in small increments whereby it can easily be positioned to follow the change in length of said mercury column, inserting the thermometer tube into the mouth of the user to register oral temperature, then, after the temperature has registered, removing the thermometer tube and moving said indicating sleeve along the tube until said index point is opposite the end of the mercury column, then placing said thermometer tube on the appropriate time-designating line with the base of the tube touching said base line, and then marking a point on said time-designating line opposite the index mark of said indicating sleeve.

References Cited in the file of this patent

UNITED STATES PATENTS

| | | |
|---|---|---|
| 821,141 | Ude | May 22, 1906 |
| 1,322,515 | Baer | Nov. 25, 1915 |
| 2,095,486 | Bolton | Oct. 12, 1937 |
| 2,201,186 | Lane | May 21, 1940 |